United States Patent
Ito et al.

(10) Patent No.: US 9,207,334 B1
(45) Date of Patent: Dec. 8, 2015

(54) METHODS AND SYSTEMS FOR A LIGHT SENSOR IN GAMMA RAY DETECTORS

(71) Applicant: General Electric Company, Schenectady, NY (US)

(72) Inventors: Mikiko Ito, Waukesha, WI (US); David Leo McDaniel, Waukesha, WI (US); Sergei Ivanovich Dolinsky, Clifton Park, NY (US); Geng Fu, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/586,050

(22) Filed: Dec. 30, 2014

(51) Int. Cl.
*G01T 1/10* (2006.01)
*G01T 1/29* (2006.01)
*G01T 1/20* (2006.01)
*G01T 1/24* (2006.01)

(52) U.S. Cl.
CPC ............. *G01T 1/2985* (2013.01); *G01T 1/2018* (2013.01); *G01T 1/248* (2013.01)

(58) Field of Classification Search
CPC .............................. G06F 13/321; G01T 1/2985
See application file for complete search history.

(56) References Cited

U.S. PATENT DOCUMENTS

| | | | |
|---|---|---|---|
| 2008/0156993 A1* | 7/2008 | Weinberg | A61B 6/12 250/363.03 |
| 2009/0082971 A1* | 3/2009 | Atzinger | A61B 6/06 702/19 |
| 2012/0153423 A1 | 6/2012 | Lee | |
| 2013/0334428 A1 | 12/2013 | Kim et al. | |

OTHER PUBLICATIONS

Xu et al., "Design of Non-orthogonal multi-channel sensor networks," 2010, IEEE International Conference on distributed computing systems, pp. 358-367.*

* cited by examiner

*Primary Examiner* — Kiho Kim
(74) *Attorney, Agent, or Firm* — Dean D. Small; The Small Patent Law Group, LLC

(57) ABSTRACT

Methods and systems for a light sensor for a gamma ray detector of a positron emission tomography (PET) imaging system is provided. The methods and systems include a plurality of micro-cells forming a micro-cell array. The methods and systems include a set of signal traces electrically coupling the plurality of micro-cells to the pin-out. The set of signal traces are configured to define a non-orthogonal signal path from each of the micro-cells to the pin-out.

20 Claims, 8 Drawing Sheets

METHODS AND SYSTEMS FOR A LIGHT SENSOR IN GAMMA RAY DETECTORS

BACKGROUND OF THE INVENTION

The subject matter disclosed herein relates generally to a light sensor in a gamma ray detector, and more particularly, to systems and methods for signal path lengths for micro-cells of the light sensor.

Gamma ray detectors may be used in different applications, such as in Positron Emission Tomography (PET) systems. PET systems perform nuclear medicine imaging that generates a three-dimensional image or picture of functional processes within a body. For example, a PET system generates images that represent the distribution of positron-emitting nuclides within the body of a patient. When a positron interacts with an electron by annihilation, the entire mass of the positron-electron pair is converted into two 511 keV photons. The photons are emitted in opposite directions along a line of response. The annihilation photons are detected by detectors that are placed along the line of response on a detector ring. When these photons arrive and are detected at the detector elements at the same time, this is referred to as coincidence. An image is then generated based on the acquired image data that includes the annihilation photon detection information.

In silicon photomultiplier (SIPM) based PET detectors, in order to cover a large area for detection of gamma rays, a large number of small area SIPM (e.g., 3×3 $mm^2$ or 4×4 $mm^2$ photomultiplier devices) are grouped to form pixel device. The SIPM is formed by a micro-cell array. Each microcell contains avalanche photo diode and quenching circuitry (e.g. quenching resistor). When a bias voltage applied to APD is above breakdown and a micro-cell detects a photon, the APD capacitance discharges to a breakdown voltage and recharging current creates a signal by a signal path and received by a pin-out which is measured by the PET system. The timing performance of the SIPM is affected by the transmit time from the micro-cell, after detecting the photon, to the pin-out. The timing performance of the SIPM is important for the PET system to accurately determine the coincidence and corresponding image data as well as the timing resolution of the PET system. Conventional SIPM's are formed using rectangular micro-cells, requiring a signal path that includes 90 degree or orthogonal "zig-zags." However, signal paths with orthogonal "zig-zags" increases the path length of traces reducing the timing performance of the SIPM.

BRIEF DESCRIPTION OF THE INVENTION

In one embodiment, a light sensor is provided for a gamma ray detector of a Positron Emission Tomography (PET) system. The light sensor may include a plurality of micro-cells forming a micro-cell array. The light sensor may also include a through via connected to a pin-out. Additionally or alternatively, the light sensor may include a connecting pad and be connected to a pin-out by wire bonds. Further, the light sensor may include a set of signal traces electrically coupling the plurality of micro-cells to the pin-out. The set of signal traces are configured to define a non-orthogonal signal path from each of the micro-cells to the pin-out.

In another embodiment, a Position Emission Tomography (PET) system is provided. The PET system may include a plurality of gamma ray detector elements configured to acquire scan data. The detector elements may have scintillator crystals with a plurality of lights sensors. Each of the plurality of light sensors may include a plurality of micro-cells forming a micro-cell array. Each of the plurality of light sensors may have a through via or wire bonds connected to a pin-out. Further, each of the plurality of light sensors may have a set of signal traces electrically coupling the plurality of micro-cells to the pin-out. The set of signal traces are configured to define a non-orthogonal signal path from each of the micro-cells to the pin-out.

DETAILED DESCRIPTION OF THE INVENTION

Figure 1:
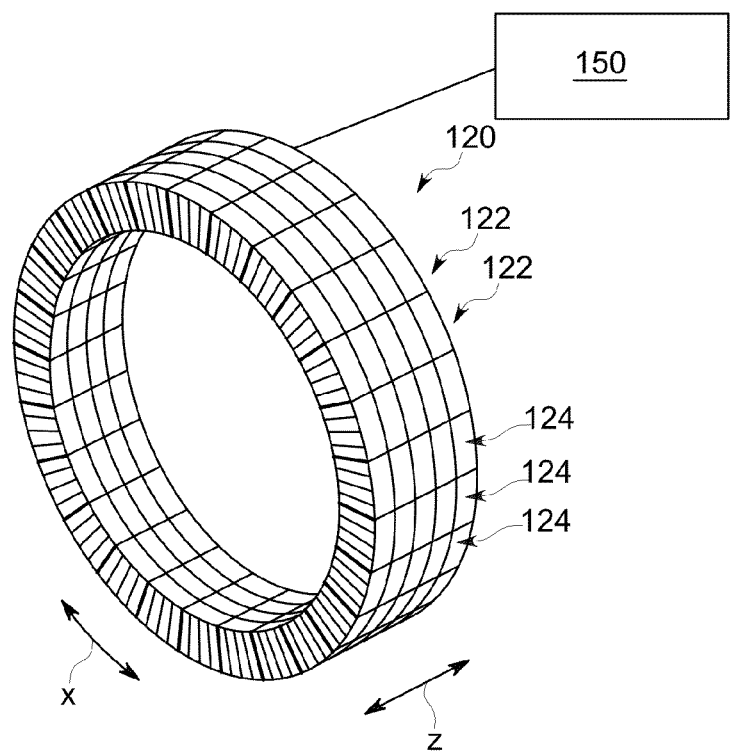
FIG. 1 is a perspective view of a positron emission tomography (PET) detector assembly in accordance with an embodiment.

The following detailed description of certain embodiments will be better understood when read in conjunction with the appended drawings. To the extent that the figures illustrate diagrams of the functional modules of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or a block of random access memory, hard disk, or the like). Similarly, the programs may be stand-alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Various embodiments provide signal trace schemes and/or architecture for light sensors of gamma ray detectors. Particularly, for light sensors that comprise of Silicon photomultipliers (SIPMs). The light sensors may be used, for example, in gamma ray detectors of Positron Emission Tomography (PET) systems or other systems, such as a PET—Magnetic Resonance Imaging (PET-MRI) systems. However, the various embodiments may be used with gamma ray detectors in non-medical imaging systems or non-imaging systems as well. The light sensors include a plurality of micro-cells that form a micro-cell array. The micro-cells may be in the shape of at least one of a hexagon, a triangle, a trapezoid, a pentagon, a ring, a circle, or a parallelogram. A plurality of signal traces electrically couple the micro-cells to a through-silicon via. The signal traces are positioned between the micro-cells defining a non-orthogonal signal path from the micro-cells to the through-silicon via. A technical effect of the shape of the micro-cells and the non-orthogonal signal path is a reduced transit time spread between the micro-cells to the through-silicon via.

Various embodiments may be used in combination with gamma ray detectors (also referred to herein as gamma detectors) in a PET system having a PET detector assembly 120 shown in perspective view in FIG. 1. However, it should be appreciated that the gamma detectors and various embodiments may be implemented in different types of imaging and non-imaging systems. In the illustrated embodiment, the PET detector assembly 120 is coupled to a controller/processor 150 that receives data or signals from the PET detector assembly 120 and may also provide control signals. The controller/processor 150 may receive gamma ray count data (e.g., coincidence count data) from a plurality of application specific integrated circuits (ASICs) connected to the PET detector assembly 120. Thus, the PET detector ring assembly 120 may be utilized to provide signals to the controller/processor 150.

In various embodiments, the PET detector assembly 120 includes a plurality of detector modules 122 that are arranged in a ring to form the PET detector ring assembly 120. Each detector module 122 is assembled from a plurality of detector units 124. A plurality of detector units 124 (also referred to as detector blocks) is assembled to form a single detector module 122, and a plurality of detector modules 122 is assembled to form the detector ring assembly 120. In at least one embodiment, the detector assembly 120 includes twenty-eight detector modules 122 that are coupled together such that the detector assembly 120 has a ring shape. In some embodiments, each detector module 122 includes twenty detector units 124 that are arranged in a 4×5 matrix. It should be realized that the quantity of detector modules 122 utilized to form the detector assembly 120 is exemplary, and that the detector assembly 120 may have more than or fewer than twenty-eight detector modules 122. Moreover, it should be realized that quantity of detector units 124 utilized to form each detector module 122 is exemplary, and that the detector module 122 may have more than or fewer than twenty detector units 124.

Figure 2:
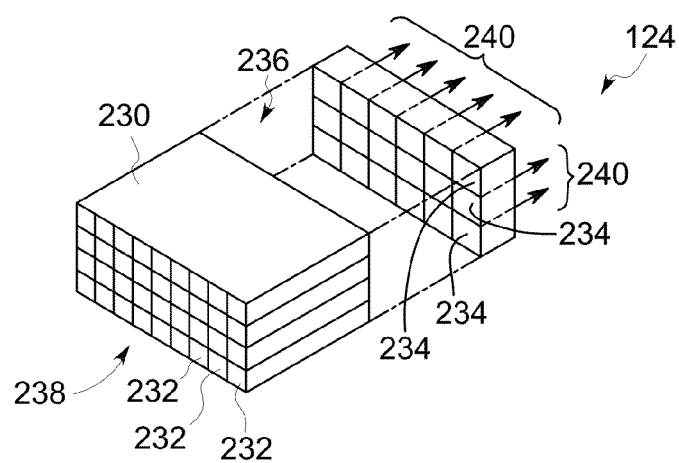
FIG. 2 is a perspective view of a detector unit formed in accordance with an embodiment.

FIG. 2 illustrates a single detector unit 124 comprising a plurality of scintillation crystals 232 that are impinged by the gamma rays and that may form a portion of the detector module 122 shown in FIG. 1. In various embodiments, the detector unit 124 includes a scintillator block 230 having the scintillator crystals 232 arranged along an x-axis and a z-axis. In one embodiment, the scintillator block 230 has thirty-six scintillation crystals 232 that are arranged in a 4×9 matrix. However, it should be realized that the scintillator block 230 may have fewer than or more than thirty-six scintillation crystals 232, and that the scintillation crystals 232 may be arranged in a matrix of any suitable size. It also should be noted that the scintillator crystals 232 may be formed from any suitable material such as bismuth germinate (BGO), Cerium-doped Lutetium Yttrium Orthosilicate (LYSO) or Gadolinium Oxyorthosilicate (GSO), among others.

The detector unit 124 also includes a plurality of light sensors 234, illustrated as a plurality of photosensors, which may be any suitable photo-detectors that sense or detect light or other electromagnetic energy. In the illustrated embodiment, the light sensors 234 are Silicon photomultipliers (SIPMs). It should be noted that the SIPMs may be formed using any known SIPM fabrication process in the art, which may be based on the particular configuration or operating characteristics of the SIPM. It also should be noted that various embodiments may be used with different types of devices. For example, various embodiments may be implemented with a single diode device (or a discrete device). However, various embodiments may also be implemented with a monolithic device having two or more anodes on the same die.

The plurality of light sensors 234 are coupled at an end of the scintillator block 230 opposite a detector face 238. The surfaces of the scintillator block 230 not coupled to the light sensors 234 are covered with a reflective layer such as Teflon, TiO2 load Epoxy, or a specular reflector. It should be noted that in some embodiments, a reflector or reflective material may be placed between some crystals in the block 230.

In various embodiments, the detector unit 124 has eighteen light sensors 234 on each end of the scintillator block 230 that are arranged in a 3×6 matrix. However, it should be realized that the detector unit 124 may have fewer than or more than eighteen light sensors 234 and that the light sensors 234 may be arranged in a matrix of any suitable size. For example, some embodiments include 36, 54 or 100 scintillator crystals 232 having corresponding light sensors 234 that are arranged in a 3×6 matrix, 6×6 matrix, 9×6 matrix or 10×10 matrix, respectively. It should be noted that in various embodiments, a one-to-one coupling between the light sensor 234 (e.g., a photosensor) and the crystal 232 is provided. However, in other embodiments a one-to-one coupling between the light sensor 234 (e.g., a photosensor) and the crystal 232 is not provided, such that there is a one-to-multiple coupling between the light sensor 234 and the crystal 232. Also, the light sensors 234 may have a different size or shape. In some embodiments, the light sensors 234 are larger than 3×3 mm$^2$. However, in other embodiments, larger or smaller light sensors 234 may be used, such as 4×6 mm$^2$ light sensors 234.

In one embodiment, the light sensors 234 are arrays of avalanche photodiodes that are connected in parallel and operated above a breakdown voltage in a Geiger mode. For example, the light sensors 234 may be SIPMs in various embodiments that are configured as single photon sensitive devices formed from an avalanche photodiode (micro-cell) array on a silicon substrate. However, it should be noted that the light sensors 234 may be any type of solid state light sensor, for example, any type of photodiode.

In operation, the scintillator crystals 232 convert the energy, deposited by a gamma ray impinging on the scintillator crystal 232, into visible (or near-UV) light photons. The photons may then be converted to electrical analog or digital signal by the light sensors 234. More specifically, when a gamma ray impinges on any one of the scintillators 232 in a detector unit 124, the scintillator detecting the gamma ray converts the energy of the gamma ray into visible light or photons. Once a micro-cell of the light sensors 234 detects a photon, the micro-cell generates a current over an amount of time dependent on the capacitance of the micro-cell. Each of the generated currents of the micro-cells is collected at pin-outs of the light sensors 234. In the exemplary embodiment, each detector unit 124 is configured to output "n" analog signals 240.

It in at least one embodiment, the output of the detector unit 125 may be a digital signal. For example, a digital counter may be electrically coupled to the micro-cells. The digital counter may output a digital signal representing a number of micro-cells that received a photon.

The scintillator crystals 232 may form a rectangular matrix of crystal elements. Each scintillator crystal 232 may be rectangular or square in shape such that a compact array can be formed. Some gamma rays strike a scintillator crystal 232 with no scattering. i.e., the gamma ray deposits all its energy in the one scintillator crystal 232. Other gamma rays may strike an electron within the scintillator crystal 232 and deposit a fraction of energy there, and then impinge a proximate scintillator crystal 232. This phenomenon is referred to as a Compton scattering event. In the latter case the gamma ray energy is absorbed in two scintillator crystals 232.

The energy deposited in the detector unit 124 of FIG. 2 (i.e., energy incident on any of an M×N matrix of the scintillation crystals 232) is determined and read out by the light sensors 234. The detected energy by the light sensors 234 may be combined to determine the total incident energy. For example, anger logic may be used to determine the specific scintillation crystal 232 that was struck by the incident gamma ray.

Accordingly, detection by the ring(s) of detectors, namely the PET detector assembly 120 (shown in FIG. 1) is based on the principle that two annihilation photons detected in close temporal proximity (e.g., within less than about 7 nanoseconds (ns) by the two oppositely disposed detector units 124 in a single ring) are likely to have originated from a single annihilation event in the patient's body somewhere along a line that connects the two detectors. All of the coincidence events detected during an imaging session are recorded by the PET scanner as raw data. Such a simultaneous detection is termed a "coincidence." The coincidence data in PET imaging is reconstructed by a computer to produce cross-sectional images in the axial, sagittal and/or coronal planes, such as using the controller/processor 150.

The electron-positron annihilation cause the emission of two 511 keV gamma rays or annihilation photons at almost 180 degrees apart. Accordingly, it is possible to localize the source location along a straight line of coincidence (also referred to as a line of response or LOR) connecting the two detected annihilation photons. In practice, the LOR has a finite width as the emitted photons are not exactly 180 degrees apart. It should be noted that if the resolving time of the detector units 124 (also referred to as the temporal window) is greater than about 1 ns, it is difficult to localize the location of the origin of the gamma rays to a segment of the LOR. If the timing resolution is better than about 1 ns, the event can be localized to a segment of the LOR. This localization process is referred to as time-of-flight (TOF) detection and is used by PET systems to determine the time difference between the detection of the photons. These systems, thus, reduce the length of the LOR segment of interest and more precisely determine the location of the origin of the gamma ray. As the timing resolution improves, the signal-to-noise ratio (SNR) of the image also improves, requiring fewer events to achieve the same image quality.

The raw data collected by a PET scanner using the PET detector assembly 120 in some embodiments includes a list of coincidence events representing near-simultaneous detection of annihilation photons by the pair of oppositely disposed detectors. Using statistics collected from the coincidence events, a set of simultaneous equations for the total activity of each portion of tissue along many LORs can be solved, and thus a map of radioactivities, as a function of location for portions of tissue, is constructed and displayed. The resulting map shows the tissues in which the molecular probe, for example, a radiopharmaceutical, has become concentrated and can be interpreted by a nuclear medicine physician or radiologist.

Figure 3:
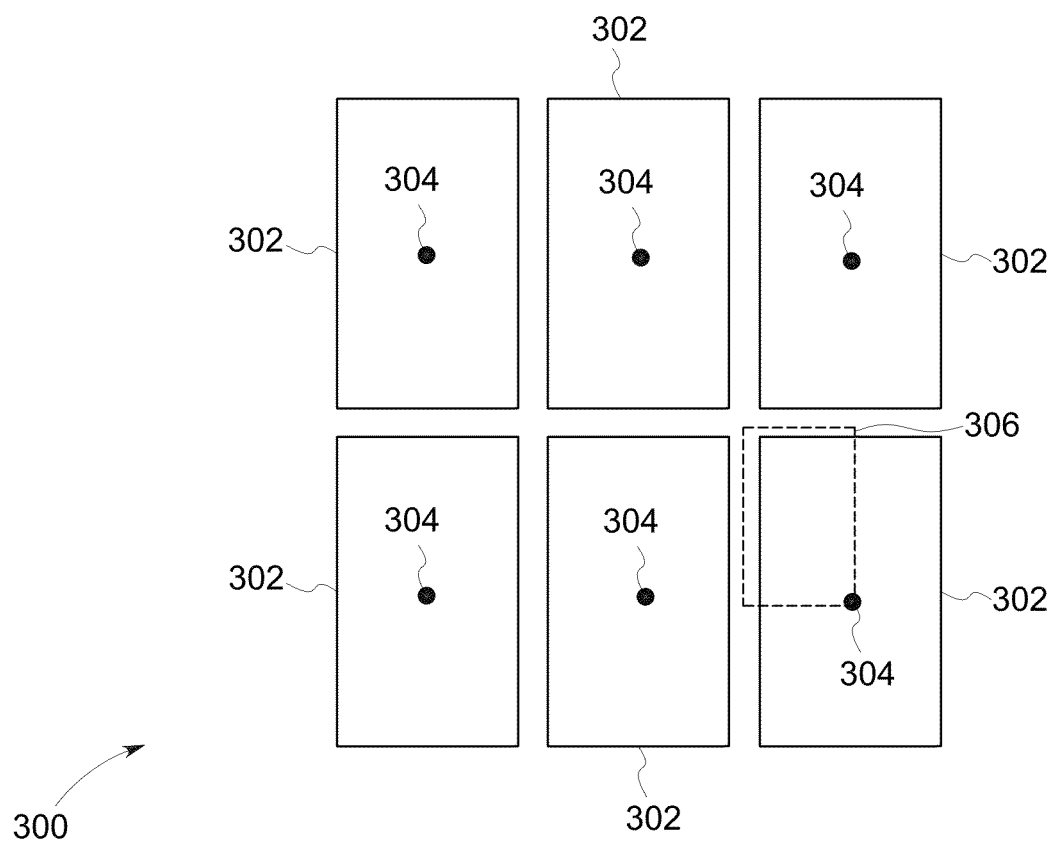
FIG. 3 is a schematic block diagram of an array of Silicon photomultipliers (SIPMs) in accordance with an embodiment.

FIG. 3 illustrates an array 300 of SIPMs 302 (illustrated as a 2×3 array) in accordance with an embodiment. Each of the SIPMs 302 includes a separate anode and each of the SIPMs 302 are biased, namely, has a bias voltage applied thereto. The SIPMs 302 also include pin-outs 304 provided in a centered position of the SIPMs. The pin-outs 304 may be connected to through vias of the silicon of the SIPM 302. For example, the pin-outs 304 may be connected to vias and the vias bump bonded to a printed circuit board (PCB). Additionally or alternatively, the pin-outs 304 may be connected to the SIPM 302 via a wire bond. For example, the pin-pouts 304 may have a wire pad and be connected to wire bonds coupled to a PCB. It should be noted that in other embodiments, the pin-outs 304 may be positioned in other locations of the SIPM 302. For example, on a side, bottom, or top of the SIPM as described in U.S. Patent Publication No. 2013/0334428, entitled, "Methods and systems for signal communication in gamma ray detectors," which is incorporated by reference in its entirety. Additionally or alternatively, in other embodiments at least one of the SIPMs 302 may have more than one pin-out 304.

Figure 4:
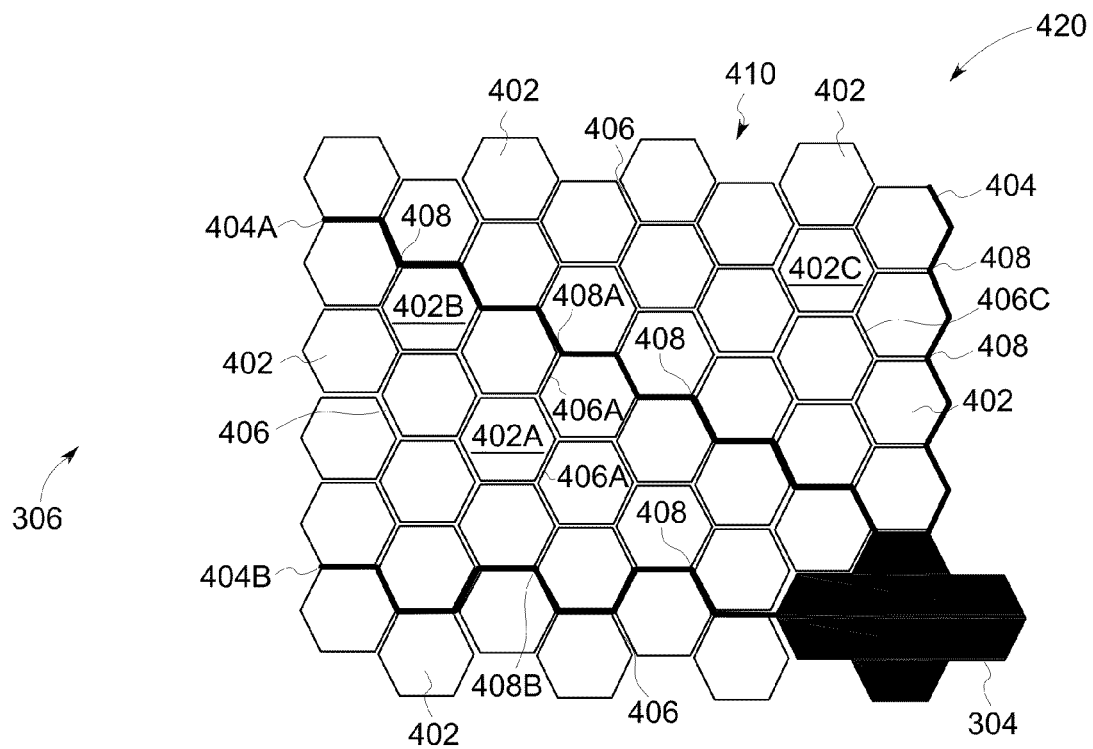
FIG. 4 is an expanded view of a portion of one of the SIPMs in FIG. 3 illustrating an array of micro-cells in accordance with an embodiment.

FIG. 4 illustrates an expanded view of a portion 306 of the SIPM 302. As can be seen in FIG. 4, each of the SIPMs 302 (a portion is shown for simplicity of illustration) includes a plurality of micro-cells 402 forming a micro-cell array 420. The micro-cells 402 are illustrated in a shape of a hexagon, and arranged using hexagon tiling to form the micro-cell array 420. It should be noted that in other embodiments, the micro-cells 402 may be in the shape of a triangle, a trapezoid, a pentagon, a ring, a circle, or a parallelogram. In various embodiments each micro-cell 402 has dimensions of between about 25 micrometers (micros)×25 microns to about 100 microns×100 microns. Accordingly, each SIPM 302 may include several hundred to several thousand micro-cells 402, such as 4000 micro-cells 402 each having dimensions of 35 microns×35 microns or 50 microns×50 microns. It should be appreciated that more or less micro-cells 402 may be provided, such as 10,000 or more micro-cells 402. The micro-cells 402 may be connected in parallel in some embodiments in a PN junction (avalanche) arrangement.

It should be noted that larger or smaller micro-cells 402 may be provided. The surface area of each micro-cell 402 corresponds to a fixed capacitance of the micro-cell 402. When, the micro-cell 402 operates in a Geiger mode the capacitance of the micro-cell 402 is used to characterize gain of the micro-cell 402, which affects an amount of output current of the micro-cell 402 when it detects a photon. In various embodiments, to ease gain calibration of the detector units 124, each of the micro-cells 402 of the SIPM 302 may have a surface area within a predetermined limit or threshold. For example, the surface areas of the micro-cells 402 of the SIPM 302 may vary by 30%. In other embodiments, the surface area may vary by less than 30% (e.g., 10%, 15%, 20%).

In various embodiments, a plurality of signal traces 404, 406 electrically couple the micro-cells 402 to the pin-out 304, and are configured to define a non-orthogonal signal path from each of the micro-cells 402 to the pin-out 304. The signal traces 404, 406 may be positioned between adjacent micro-cells 402, and have a length from an edge of the SIPM 302 to the pin-out 304. Additionally or alternatively, some of the signal traces 406 may have a length bounded by a pair of the signal traces 404, 406.

It should be noted that the signal traces 404, 406 may be formed from any suitable material. For example, in one embodiment, the signal traces 404, 406 are formed from aluminum. Optionally, the signal traces 404, 406 are aluminum traces formed by a metal deposition process on a Silicon device (e.g., silicon wafer), such as using a complementary metal-oxide-semiconductor (CMOS) process. In some other embodiments, other metals, such as gold (or thicker traces) can be used to reduce the impedance and inductance of a trace. Additionally or alternatively, the signal traces 404, 406 may be interconnected, for example at nodes 408, using any suitable process. In various embodiments, the plurality of signal traces 404, 406 may be subdivided into two subsets, the signal traces 404 and the signal traces 406.

The signal traces 406 extend from the signal traces 404. It should be noted that although three signal traces 404 are illustrated, more or less signal traces may be provided as desired or needed, for example, based on the size of the SIPM 302. The signal traces 404, in at least one embodiment, may be thicker than the signal traces 406 allowing the signal traces 404 to have a higher conductance relative to the thinner signal traces 406. For example, in the illustrated embodiment, the signal traces 406 may have a thickness of about 8 microns. However, the signal traces 404 may be thicker or thinner, such as 10-20 microns. It should be noted that the signal traces 404 and 406 described herein may be any type of conductive trace.

In operation, signals travel through a non-orthogonal signal path defined by the signal traces 406 and are combined at nodes 408 to the corresponding signal traces 404. Based on the nodes 408, the non-orthogonal signal path for at least one of the micro-cells may travel through a first and second signal trace 406 and 408. For example, a signal (e.g., discharge of the current resulting from a photon) is generated from the micro-cell 402a. The signal trace 406a is connected to the micro-cell 402a, and carries portions of the signal along the non-orthogonal signal path from the micro-cell 402a to the nodes 408a and 408b. From the nodes 408a and 408b the signal travels further along the non-orthogonal signal path along the signal traces 404a and 404b, respectively, to the pin-out 304. In various embodiments, the signal of the micro-cell 402 travels through a particular signal trace 404, 406 depending on the distance of the micro-cell 402 from the trace (e.g., signal travels to the closer trace). However, it should be appreciated that the signal flow through the signal traces 406 may be different so that the signals may be distributed among different ones of the signals traces 404.

Additionally or alternatively, the signals travel proportionally more through a single non-orthogonal signal path defined by one of the signal traces 406 and/or 404 than other adjacent signal traces. For example, a signal (e.g., discharge of the current resulting from a photon) is generated from the micro-cell 402b. The signal trace 404a is connected to the micro-cell 402b. The signal trace 404a carries a larger proportion of the signal, due to the higher conductivity of the signal trace 404a than the surrounding signal traces 406. The signal trace 404a carries the signal along the non-orthogonal signal path defined by the signal trace 404a from the micro-cell 402b to the pin-out 304. The remaining signal, not carried by the signal trace 404a, may be carried by the signal trace 406a to another signal trace such as the signal trace 404b or alternative signal trace 406 to the pin-out 404.

In another example, a signal (e.g., discharge of the current resulting from a photon) is emitted from the micro-cell 402c. The signal traces 406 and 404 may have the same thickness resulting in each of the signal traces 406 and 404 having approximately the same conductance. The signal trace 406c is connected to the micro-cell 402c. The signal trace 406c carries the signal along the non-orthogonal signal path, defined by the signal trace 406c, from the micro-cell 402b to the pin-out 304.

Figure 5:
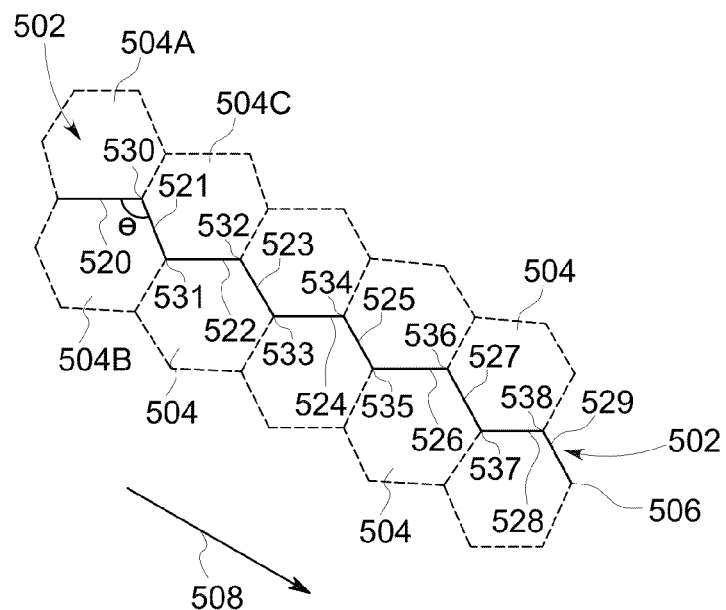
FIG. 5 is a diagram illustrating a non-orthogonal signal path with a plurality of hexagon shaped micro-cells in accordance with an embodiment.
Figure 6:
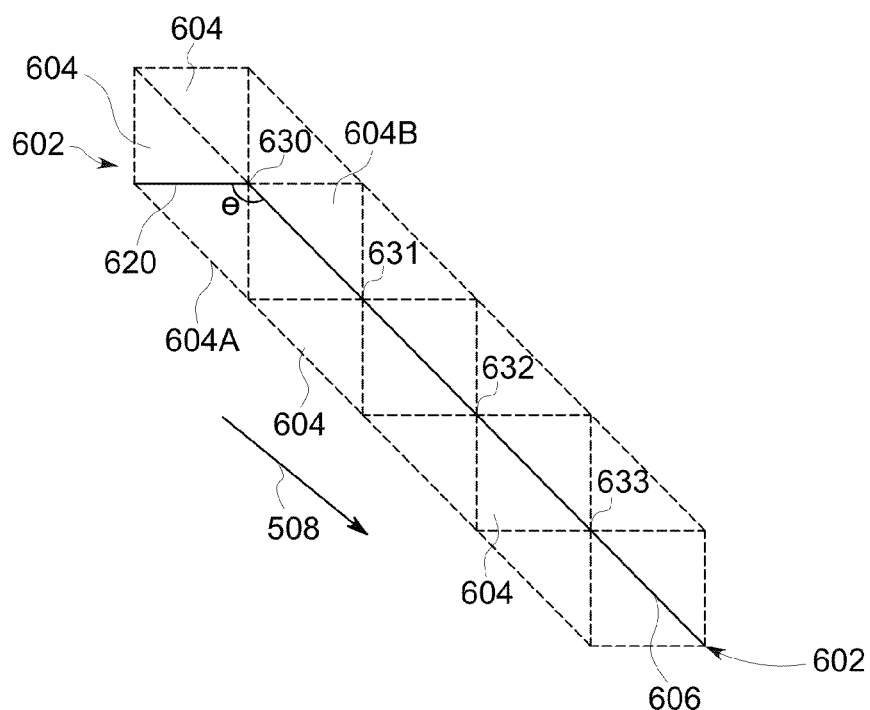
FIG. 6 is a diagram illustrating a non-orthogonal signal path with a plurality of triangle shaped micro-cells in accordance with an embodiment.
Figure 7:
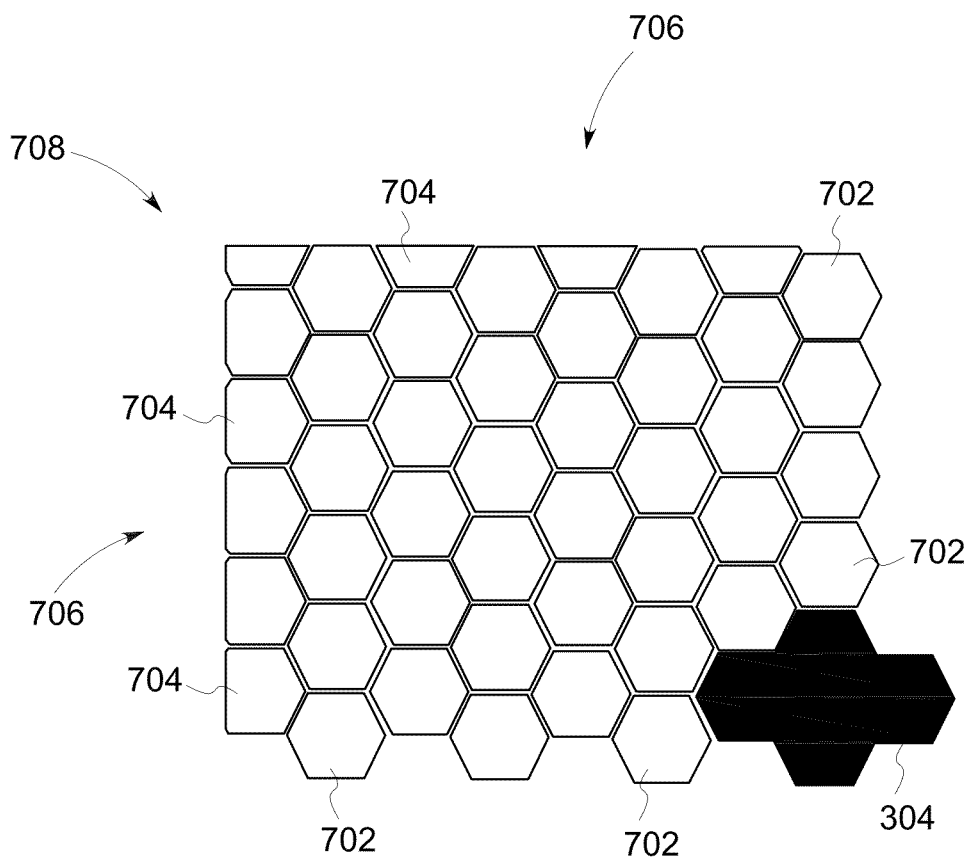
FIG. 7 is an expanded view of a portion of one of the SIPMs in FIG. 3 illustrating an array of micro-cells in accordance with an embodiment.

Non-orthogonal signal paths defined by the signal traces 404, 406 are described further in connection to FIGS. 5-7. The non-orthogonal signal path is the direction and distance that a signal originating from the micro-cell 402 travels from the micro-cell 402 to the pin-out 304 connected by the through via or wire bond. The direction and distance of the non-orthogonal signal path may be dependent on the shape (e.g., hexagon, a triangle, a trapezoid, a ring, a circle, a pentagon, a parallelogram) of each micro-cell 402, which define the geometric boundaries of the micro-cell 402.

FIG. 5 is a diagram illustrating a portion of a non-orthogonal signal path 502 with a plurality of hexagon shaped micro-cells 504 (e.g., illustrated with a dashed outline) in accordance with an embodiment. The non-orthogonal signal path 502 may be defined by a signal trace 506, which is positioned between adjacent micro-cells 504. The non-orthogonal signal path 502 may be subdivided into directional subsets 520-529 corresponding to a direction of the non-orthogonal signal path 502 as the signal trace 506 traverses between or along the boundary of the micro-cells 504 in the direction of an arrow 508, towards the through via or wire bond connected to the pin-out (not shown) or to a node (e.g., the node 408)(not shown). Each directional subset 520-529 may be between a unique pair of adjacent micro-cells 504. For example, the directional subset 520 is positioned between the micro-cells 504a and 504b, and the directional subset 521 is positioned between the micro-cells 504b and 504c. Each directional subset 520-529 may be separated by a transition point 530-538. The transition point 530-538 corresponds to a beginning of a subsequent directional subset 520-529, and may represent a change in direction of a signal traveling along the non-orthogonal signal path 502 for each directional subset 520-529.

For example, a signal is generated from the micro-cell 504a. The signal trace 506 is connected to the micro-cell 504a. The signal trace 506 carries the signal along the non-orthogonal signal path 502, beginning at the directional subset 520, ending at the through via or wire bond connected to the pin-out in the direction of the arrow 508. The signal trace 506 carries the signal from the directional subset 520 at a direction and orientation with respect to the through via or wire bond defined by the signal trace 506. The signal trace 506 carries the signal from the directional subset 520 to the subsequent directional subset 522, which is connected at the transition point 530. The signal travels along the non-orthogonal signal path 502 defined by the signal trace 506 in the direction of the arrow 508 towards the through via or wire bond. At the transition point 530, a direction or orientation of the signal is adjusted by θ with respect to the directional subset 520. Particularly, the signal is adjusted by approximately 120 degrees based on the shape, or particularly the boundary, of the micro-cell 504b and 504c.

The direction and/or change in direction of the signal at the transition points 530-538 characterizes the non-orthogonal signal path 502. It should be noted that a signal traveling along an orthogonal signal path, for example, includes at least one transition point of a signal trace or a connection of multiple signal traces from the micro-cell to a pin-out having a change in direction of approximately ninety degrees (e.g., within 10%). Such as the signal paths defined by the signal traces in as described in U.S. Patent Publication No. 2013/

0334428. The orthogonal signal path may correspond to the rectangle shape of the micro-cells, which define the signal traces. Alternatively, non-orthogonal signal paths (e.g., 502), for example, have transition points 530-539 of a signal trace 506 or a connection of multiple signal traces (e.g., at a node 408) from the micro-cell 504 to a pin-out may change direction of the signal at greater than one hundred degrees, less than eighty degrees, or the like (e.g., not approximately ninety degrees).

Additionally or alternatively, a portion of the transition points 630-633 of a non-orthogonal path 602 may not change directions of the signal. FIG. 6 is a diagram illustrating a portion of the non-orthogonal signal path 602 with a plurality of triangle shaped micro-cells 604 (e.g., illustrated with a dashed outline) in accordance with an embodiment. A signal trace 606 carries a signal along the non-orthogonal signal path 602, beginning at the directional subset 620, ending at the through via or wire bond connected to the pin-out (not shown) in the direction of the arrow 508. The signal trace 606 carries the signal from the directional subset 620 at a direction and orientation with respect to the through via or wire bond defined by the signal trace 606. At the transition point 630, a direction or orientation of the signal is adjusted by θ with respect to the directional subset 620. Particularly, the signal is adjusted by approximately 60 degrees based on the boundary of the micro-cell 604a and 604b. Alternatively, at the transition points 631-633, a direction or orientation of the signal is not adjusted.

In various other embodiments, the shape and/or size of the micro-cells 702, 704 of the SIPM 302 may be different. For example, in connection to FIG. 7, the plurality of micro-cells 702, 704 may include a first subset of micro-cells 702 having a first shape that form at least part of an edge 706 of a micro-cell array 708, and a second subset of micro-cells 702 having a second shape, wherein the first shape is different than the second shape. FIG. 7 is an expanded view of another embodiment of a portion of the micro-cell array 708 of at least one of the SIPMs 302 in FIG. 3. The micro-cells 702 have a hexagon shape, and form a portion of the micro-cell array 708. Due to the hexagon tiling layout, which forms the micro-cell array 708, different shaped micro-cells 704 are used to form the edge 706 of the SIPM 302. Without the micro-cells 704, holes or gaps (e.g., gap 410) between the edge 706 of the micro-cell array 708 and the micro-cells 702 may be formed.

Gaps represent an area of the micro-cell array between the edge and the micro-cells that do not include a micro-cell and/or signal trace. Photons present in the gaps may not me detected by the SIPM 302. For example, in FIG. 4, a gap 410 is present in the micro-cell array 420. The micro-cells 704 are configured with a different shape, for example other than the hexagon shape of the micro-cells 702. The micro-cells 704 is shown in the shape of a half hexagon. However, in various other embodiments the micro-cells 704 may be in other shapes.

Figure 8:
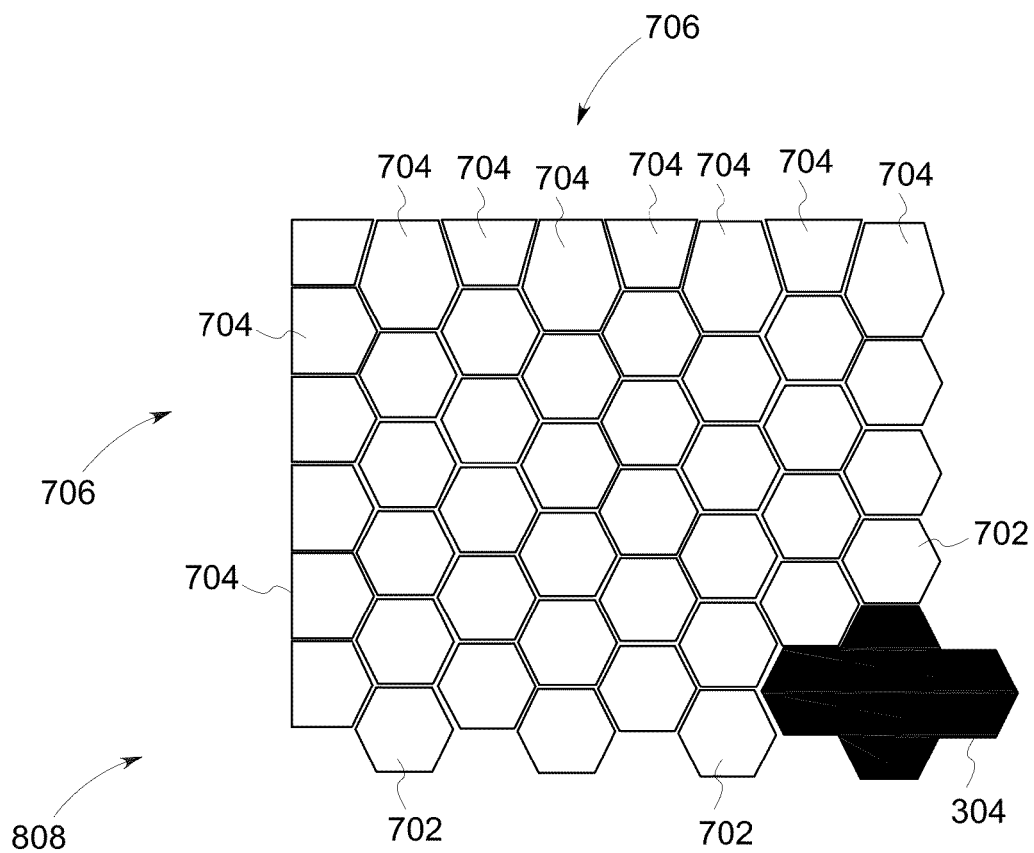
FIG. 8 is an expanded view of a portion of one of the SIPMs in FIG. 3 illustrating an array of micro-cells in accordance with an embodiment.
Figure 9:
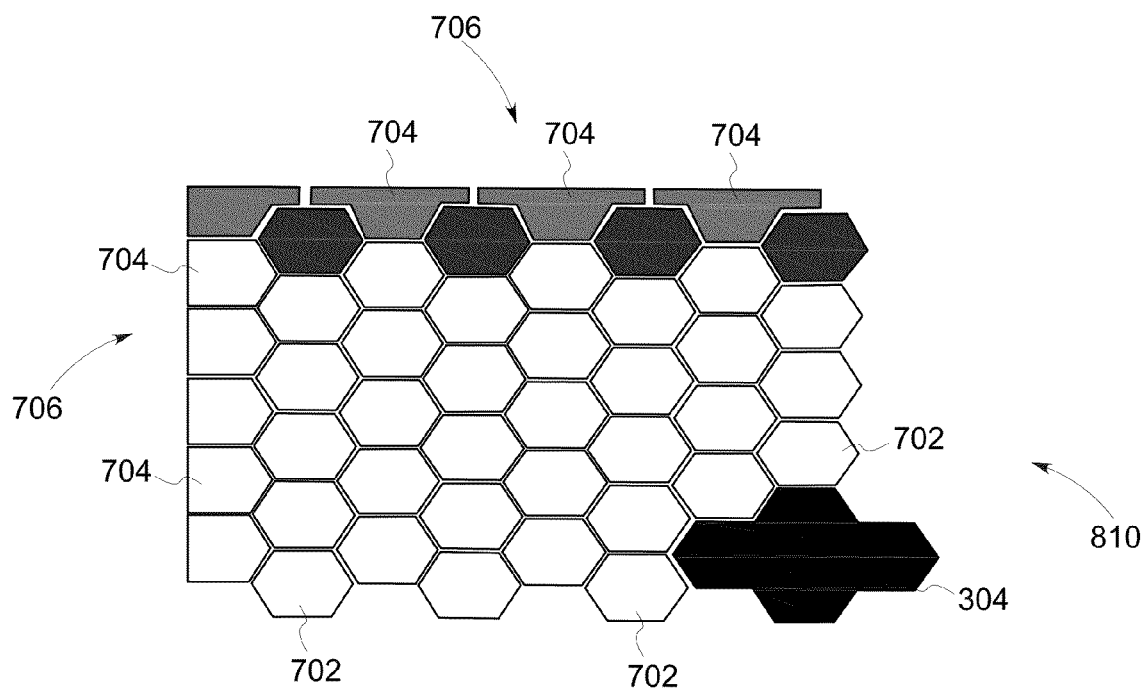
FIG. 9 is an expanded view of a portion of one of the SIPMs in FIG. 3 illustrating an array of micro-cells in accordance with an embodiment.

For example, in connection with FIGS. 8-9, a shape of the micro-cells 704 along the edge 706 may be adjusted. FIGS. 8 and 9 are expanded views of other embodiments 808 and 810 of a portion of the micro-cell array 708 of at least one of the SIPMs 302 in FIG. 3. FIG. 8 illustrates the micro-cells 704 having an elongated hexagon shape. FIG. 9 illustrates the micro-cells 704 having a "T" like shape. The elongated hexagon and "T" shapes allow the capacitance of the micro-cells 704 to be approximately the same as the capacitance of the micro-cells 702, which allows the gain of the micro-cells 702 and 704 to be approximately the same. As previously described above, the capacitance of the micro-cells 702 and 704 are used to characterize the gain of each of the micro-cells 702 and 704. The gain affects an amount of output current over time of the micro-cell 702 and 704 when exposed to a photon. In various embodiments, the variance between the capacitances of the micro-cells 702 and 704 may be within 15%, which corresponds to the size and/or dimensions of the surface area of the micro-cells 702 and 704 of the SIPM 302 may vary by approximately 30%.

Figure 10:
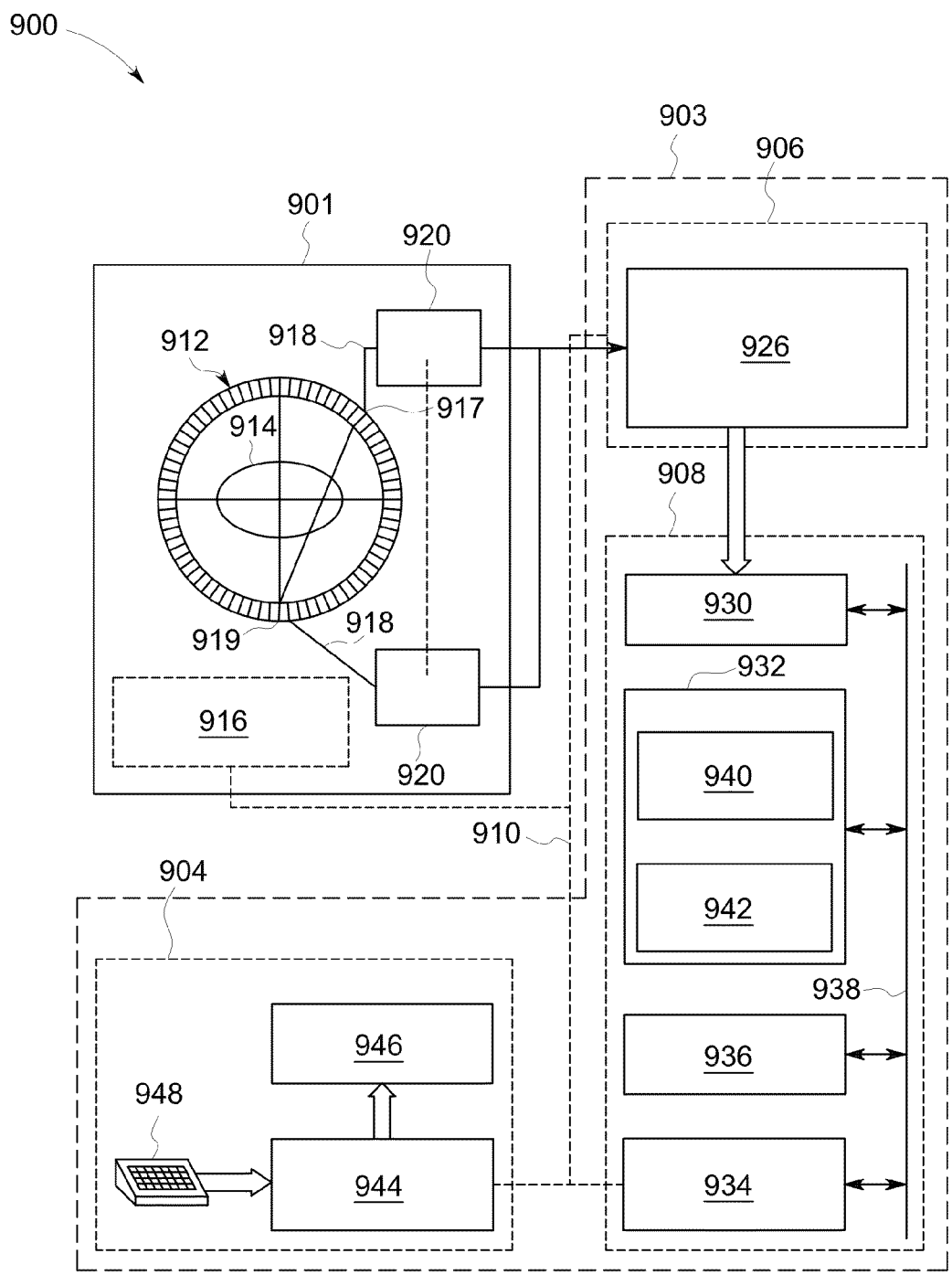
FIG. 10 is a diagram of a PET system in accordance with an embodiment.

FIG. 10 is a block diagram of an exemplary embodiment of a PET system 900 in which various embodiments of the invention may be implemented. The PET system 900 includes a PET scanner 901 and a controller 903 to control image reconstruction processes. The controller 903 includes an operator workstation 904 and a processor 905. The processor 905 includes a data acquisition processor 906 and an image reconstruction processor 908. The PET scanner 901, operator workstation 904, data acquisition processor 906 and image reconstruction processor 908 are interconnected via a communication link 910 (e.g., a serial communication or wireless link) The PET scanner 901, which typically includes a gantry (not shown), acquires scan data and transmits the data to the data acquisition processor 906. The operation of the PET scanner 901 is controlled from operator workstation 904. The data acquired by data acquisition processor 906 is reconstructed using image reconstruction processor 908.

The PET scanner 901 may operate, using, for example, a plurality of detector rings. One such detector ring, detector ring 912, is illustrated in FIG. 10, which may be embodied as the detector ring assembly 120 (shown in FIG. 1) that includes SIPMs formed in accordance with various embodiments. The detector ring 912 includes a central opening, in which an object 914 (e.g., a patient) may be positioned, using, for example, a motorized table that is aligned with the central axis of the ring 912. The motorized table moves the object 914 into the central opening of the ring 912, in response to one or more commands received from operator workstation 904. A PET scanner controller 916, also referred to as a gantry controller, is provided (e.g., mounted) in the PET scanner 901. The PET scanner controller 916 responds to the commands received from the operator workstation 904 through the communication link 910. Therefore, the operation of the PET scanner 901 is controlled from the operator workstation 904 through the PET scanner controller 916.

The detector ring 912 includes a plurality of detector elements for performing a PET scan of the object 914. For example, there may be 420 crystals per ring and 24 rings in the scanner. As shown in FIG. 10, the detector ring 912 includes a first detector element 917, a second detector element 919, and several other detectors. It should be noted that the detector elements are referred to as the first detector element and the second detector element, only to differentiate location in FIG. 10. The first detector element 917, like the other detectors, includes a set of scintillator crystals arranged in a matrix that is disposed in front of a plurality of photosensors (e.g., the light sensors 34) as described in more detail herein. When an annihilation photon impinges on a crystal on a detector, the annihilation photon produces a scintillation in the crystal. Each photosensor produces an analog or digital signal on the communication line 918 when a scintillation event occurs. A set of acquisition circuits 920 is provided within the PET scanner 901 to receive these analog or digital signals. The acquisition circuits 920 may include analog-to-digital converters to digitize analog signals, processing electronics to quantify event signals and a time measurement unit to determine time of events relative to other events in the system. For example, this information indicates when the event took place and the identity of the scintillation crystal that detected the event. The acquisition circuits produce digital data indicating the location, time and total energy of the event. This event data is transmitted through a communication link, for example, a cable, to a coincidence detector or processor 926.

The coincidence detector 926 receives the event data packets from the acquisition circuits 920 and determines if any two of the detected events are in coincidence. In this context, the coincidence is determined by a number of factors. First, the time markers in each event data packet must be within a predetermined time period, for example, 6 ns, of each other. Secondly, the LOR formed by a straight line joining the two detectors that detect the coincidence event should pass through the field of view in PET scanner 901. Events that cannot be paired are discarded. Coincident event pairs are recorded as a coincidence data packet that is communicated through a communication link to a sorter 930 in the image reconstruction processor 908.

The image reconstruction processor 908 includes the sorter 930, a memory module 932, an image CPU 934, an array processor 936, and a back-plane bus 938. The sorter 930 counts all events that occur along each projection ray and organizes them into a coincidence data set. In one embodiment, this data set is organized as a data array 940, referred to as a sinogram. The data array 940 is stored in the memory module 932. The back-plane bus 938 is linked to the communication link 910 through the image CPU 934, which controls communication through the back-plane bus 938. The array processor 936 is also connected to the back-plane bus 938, receives the data array 940 as an input, and reconstructs images in the form of the image arrays 942. The resulting image arrays 942 are stored in the memory module 932.

The images stored in the image array 942 are communicated by the image CPU 934 to the operator workstation 904. The operator workstation 904 includes a CPU 944, a display device 946, and an input device 948. The CPU 944 connects to the communication link 910 and receives inputs (e.g., user commands) from the input device 948, which may be, for example, a keyboard, mouse, or a touch-screen panel. The operator can control the calibration of the PET scanner 901, the configuration of the PET scanner 901, and the positioning of the object 914 for a scan through the input device 948 and associated control panel switches. Similarly, the operator can also control the display of the resulting image on the display device 946 and perform image-enhancement functions, using programs executed by the workstation CPU 944.

The processor 905 is configured to process the scan data received from the detector elements. The scan data includes, for example, sinogram and timing information that is received by processor 905 from the detector elements during an imaging scan. The timing information in one embodiment is the difference in time at which two annihilation photons emitted in an annihilation event are detected by detector elements. The timing information may include time stamp information relating to a measured annihilation event detected by a pair of detector elements, for example, the first detector element 917 and the second detector element 919, for the PET system 900. The time stamp information is the time at which each annihilation photon is detected by a detector element, which in various embodiments.

The timing information is received by detectors, which include, for example, a block of 36 scintillator crystals attached to an array of photosensors. The scintillator crystals convert the incoming annihilation photon from the patient into a plurality (e.g., several thousand) of light photons (e.g., visible or near UV), which are detected by the photosensors. The proportion of light photons detected by each photosensor channel is used to determine which of the 36 crystals received the incoming photon. The timing signal is determined by processing the leading edge of the signals, to estimate the arrival of the light photons at the light sensors 34 of, for example, the SIPM. This timing signal is then digitized and processed subsequently.

The energy and timing information are used to reconstruct an image of the object 914, scanned by the PET system 900. The reconstruction may include, for example, a two-dimensional or three-dimensional reconstruction. The timing data of each detector element may be configured as a timing bias matrix with a timing recovery value for each set of projection rays of the PET system 900. It should be noted that a detector element pair detects the projection rays from an annihilation event. The timing bias data of each detector element pair corresponding to the projection ray is stored in the memory module 932 of the PET system 900.

It should be noted that the various embodiments may be implemented in hardware, software or a combination thereof. The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid-state drive, optical disk drive, and the like. The storage device may also be other similar means for loading computer programs or other instructions into the computer or processor.

As used herein, the term "computer," "subsystem" or "module" may include any processor-based or microprocessor-based system including systems using microcontrollers, reduced instruction set computers (RISC), ASICs, logic circuits, and any other circuit or processor capable of executing the functions described herein. The above examples are exemplary only, and are thus not intended to limit in any way the definition and/or meaning of the term "computer".

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, and denotes structural requirements of any structure, limitation, or element that is described as being "configured to" perform the task or operation. For example, a processing unit, processor, or computer that is "configured to" perform a task or operation may be understood as being particularly structured to perform the task or operation (e.g., having one or more programs or instructions stored thereon or used in conjunction therewith tailored or intended to perform the task or operation, and/or having an arrangement of processing circuitry tailored or intended to perform the task or operation). For the purposes of clarity and the avoidance of doubt, a general purpose computer (which may become "configured to" perform the task or operation if appropriately programmed) is not "configured to" perform a task or operation unless or until specifically programmed or structurally modified to perform the task or operation.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f) unless and until such claim limitations expressly use the phrase "means for" followed by a statement of function void of further structure.

This written description uses examples to disclose the various embodiments, including the best mode, and also to enable any person skilled in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal language of the claims.

What is claimed is:

1. A light sensor for a gamma ray detector of a positron emission tomography (PET) imaging system comprising:
    a plurality of micro-cells forming a micro-cell array; and
    a set of signal traces electrically coupling the plurality of micro-cells to a pin-out, wherein the set of signal traces are configured to define a non-orthogonal signal path from each of the micro-cells to the pin-out.

2. The light sensor of claim 1, wherein the non-orthogonal signal path for each micro-cell is based on a position of the micro-cell relative to the pin-out.

3. The light sensor of claim 1, wherein at least one of the non-orthogonal signal paths includes a first and second directional subset separated by a transition point, wherein a direction of a signal traveling along the non-orthogonal signal path is adjusted at the transition point based on a shape of the micro-cell.

4. The light sensor of claim 1, wherein the plurality of micro-cells include a first subset of micro-cells having a first shape, the first subset of micro-cells forming at least part of an edge of the micro-cell array and a second subset of micro-cells having a second shape, wherein the first shape is different than the second shape.

5. The light sensor of claim 4, wherein a surface area of the first subset of micro-cells is approximately the same as the surface area of the second subset of micro-cells such that the capacitances of the first and second subset are within a predetermined threshold.

6. The light sensor of claim 5, wherein the predetermined threshold is a fifteen percent variance between the capacitances of the first and second subset.

7. The light sensor of claim 1, wherein one or more micro-cells are in the shape of a hexagon, a triangle, a trapezoid, a pentagon, a ring, or a parallelogram.

8. The light sensor of claim 1, wherein the non-orthogonal signal path for at least one of the micro-cells travels through a first and second signal trace.

9. The light sensor of claim 8, wherein the first signal trace connects more than one micro-cell to the second signal trace, the second signal trace is connected to the first signal trace and the pin-out.

10. The light sensor of claim 8, wherein the second signal trace has a higher conductance than the first signal trace.

11. A Position Emission Tomography (PET) system comprising:
    a plurality of gamma ray detector elements configured to acquire scan data, the detector elements having scintillator crystals with a plurality of lights sensors, the plurality of light sensors having a plurality of micro-cells, each of the plurality of light sensors having,
    a set of signal traces electrically coupling the plurality of micro-cells to a pin-out, wherein the set of signal traces are configured to define a non-orthogonal signal path from each of the micro-cells to the pin-out.

12. The PET system of claim 11, wherein the non-orthogonal signal path for each micro-cell is based on a position of the micro-cell relative to the pin-out.

13. The PET system of claim 11, wherein at least one of the non-orthogonal signal paths includes a first and second directional subset separated by a transition point, wherein a direction of a signal traveling along the non-orthogonal signal path is adjusted at the transition point based on a shape of the micro-cell.

14. The PET system of claim 11, wherein the plurality of micro-cells include a first subset of micro-cells having a first shape, the first subset of micro-cells forming at least part of an edge of the micro-cell array and a second subset of micro-cells having a second shape, wherein the first shape is different than the second shape.

15. The PET system of claim 14, wherein a surface area of the first subset of micro-cells is approximately the same as the surface area of the second subset of micro-cells such that the capacitances of the first and second subset are within a predetermined threshold.

16. The PET system of claim 15, wherein the predetermined threshold is a fifteen percent variance between the capacitances of the first and second subset.

17. The PET system of claim 11, wherein the plurality of light sensors comprise one or more Silicon photomultipliers (SIPMs).

18. The PET system of claim 11, wherein one or more micro-cells are in the shape of a hexagon, a triangle, a trapezoid, a pentagon, a ring, or a parallelogram.

19. The PET system of claim 11, wherein the non-orthogonal signal path for at least one of the micro-cells travels through a first and second signal trace.

20. The PET system of claim 19, wherein the first signal trace connects more than one micro-cell to the second signal trace, the second signal trace is connected to the first signal trace and the pin-out.

* * * * *